Feb. 29, 1944.  E. F. WEBB  2,342,712
POWER TRANSMISSION
Original Filed Sept. 27, 1940   3 Sheets-Sheet 1
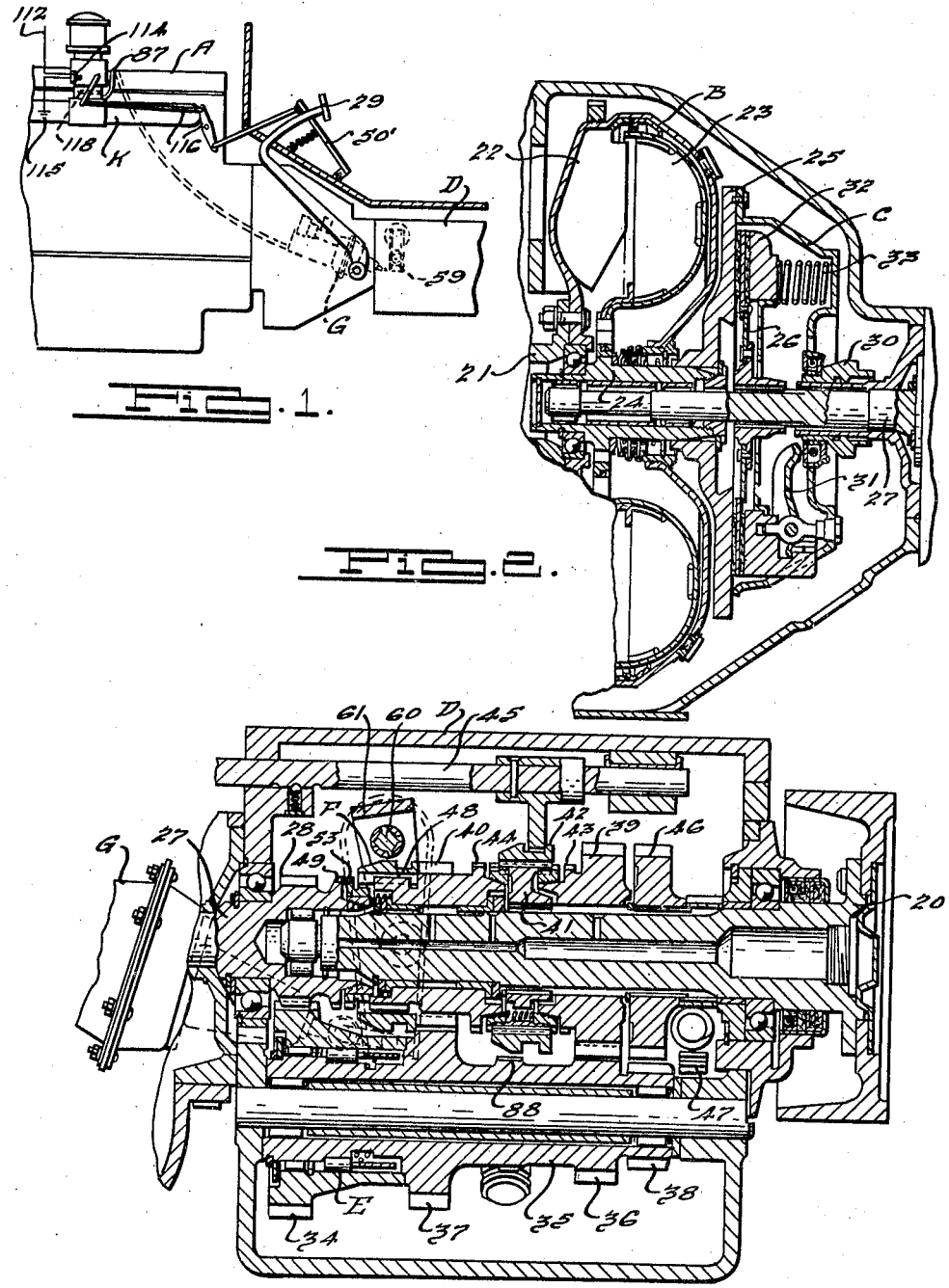
INVENTOR
Edmond F. Webb
BY
ATTORNEYS

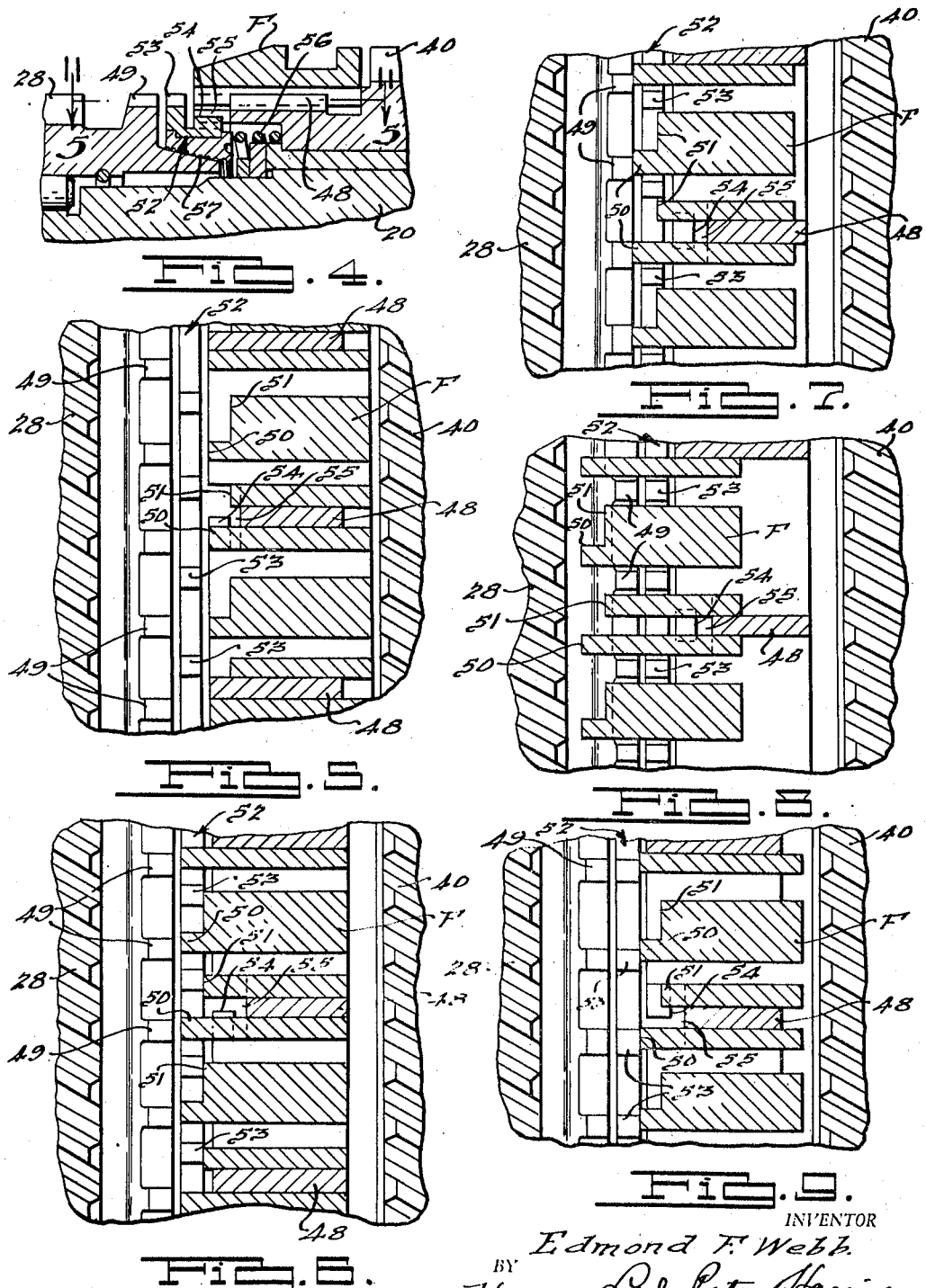

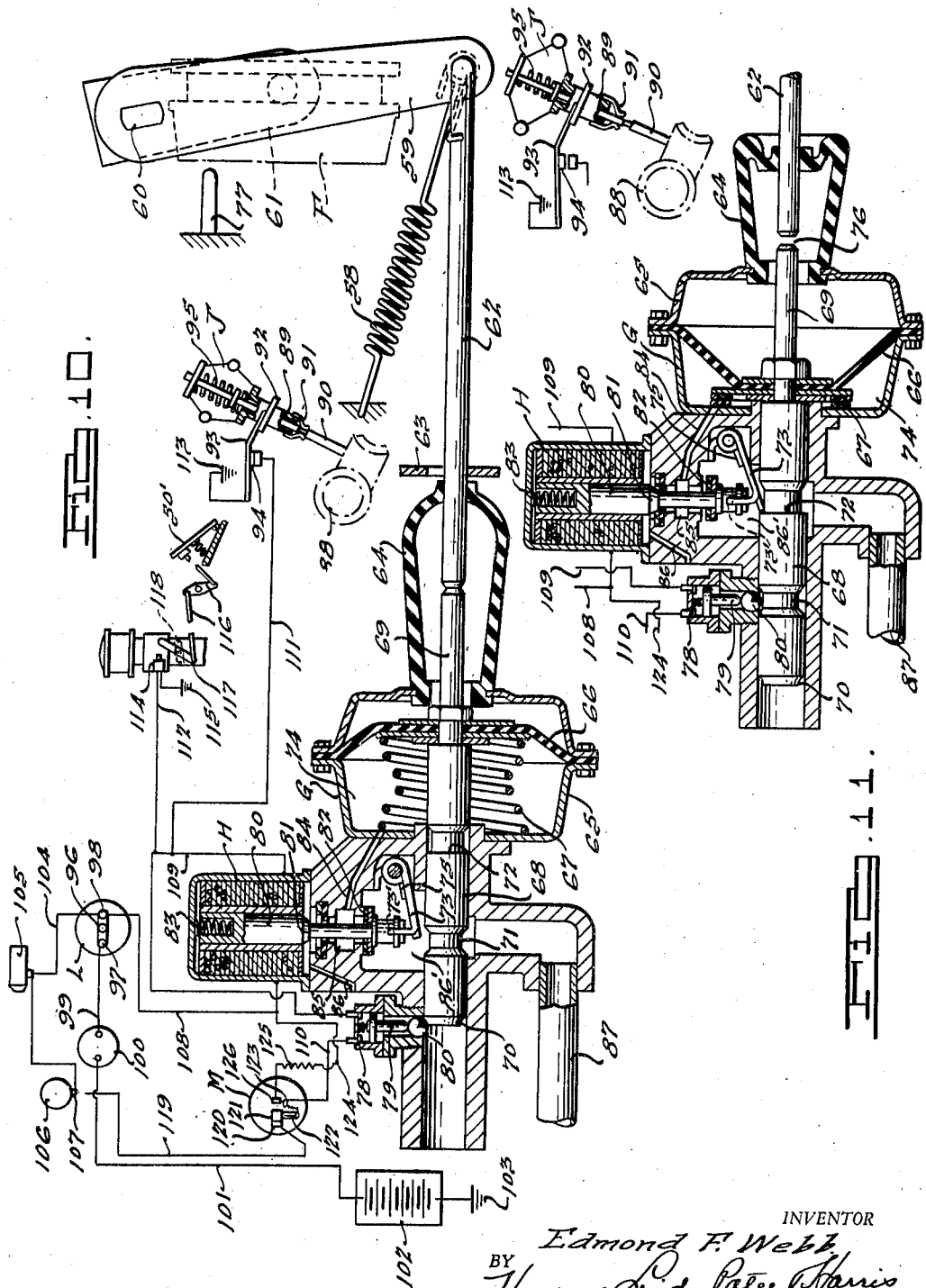

Patented Feb. 29, 1944

2,342,712

UNITED STATES PATENT OFFICE 2,342,712

POWER TRANSMISSION

Edmond F. Webb, Franklin Village, Mich., assignor to Chrysler Corporation, Highland Park, Mich., a corporation of Delaware Original application September 27, 1940, Serial No. 358,636. Divided and this application May 14, 1943, Serial No. 486,930

8 Claims. (Cl. 74—472)

This invention relates to motor vehicles and refers more particularly to power transmission and control mechanism therefor.

My invention has particular reference to transmission systems in which the engine ignition is momentarily interrupted in order to unload positively engageable drive control elements so as to facilitate disengagement of such elements. One example of such a transmission is described and claimed in the copending application of Carl A. Neracher et al., Serial No. 335,310, filed May 15, 1940. In such transmission systems, the engine ignition sometimes is grounded beyond the desired momentary period either as a characteristic of the transmission control mechanism, because of failure of the mechnaism to properly function, or for other reasons. When the ignition system is thus interrupted, usually by grounding the same, the engine is often rendered inoperative so that the car cannot be driven under its own power, or the change speed mechanism does not function properly.

It is an object of my invention to provide means for remedying the foregoing difficulties whereby the engine ignition is automatically restored after a predetermined time of interruption regardless of the proper functioning of the transmission control mechanism which is ordinarily provided for momentarily interrupting the ignition system.

Another object is to provide time control means for restoring the engine to normal functioning in the event that the primary engine interrupting system fails to restore the engine to normal functioning.

A further object is to provide means for lessening the time of ignition interruption occasioned by the usual transmission control mechanism so that the time of ignition interruption is fixed and independent of the time taken to complete a cycle of the primary ignition interrupting means.

This application is a division of co-pending application Serial No. 358,636 filed September 27, 1940, by Edmond F. Webb and Victor E. Matulaitis.

Further objects and advantages of my invention will be more apparent from the following illustrative embodiment thereof, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

While this control may be employed in conjunction with various types and arrangements of motor vehicle transmissions, in order to illustrate one driving system the invention is shown in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as abefore.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable motor means for controlling shift of sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a leader rod 68 which has a rear extension 69 aligned with rod 62.

Rod 68 has a series of detents 70, 71 and 72, the latter cooperating with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributer of the ignition system whereby the engine ignition may be momentarily rendered ineffective thereby unloading the torque at sleeve F sufficiently to insure its released by spring 67. This ignition interrupting system is under control of an interrupter switch 78 which is closed by plunger 79 and ball 80 whenever rod 69 moves between the Fig. 10 and Fig. 11 positions by reason of the enlarged rod portion between detents 70, 71. Detent 71 is so arranged that, with the parts as in Fig. 11 and sleeve F clutched, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 78 then opening by detent 70 to restore the ignition system.

The vacuum supply to chamber 74 is under control of electromagnet means in the form of a solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the breakaway being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

The driver operated ignition switch is designated at L and comprises a conductor 96 which, in the Fig. 10 position showing the switch "on" or closed, electrically connects contacts 97 and 98. Contact 97 extends by conductor 99 to ammeter 100 and thence by conductor 101 to the usual storage battery 102 and thence to ground 103. Contact 98 has a conductor 104 extending therefrom to the engine ignition system herein shown in part as comprising coil 105 and distributer 106 having a primary terminal 107.

A second conductor 108 extends from contact 98 to the solenoid H and thence by conductor 109 to one terminal of ignition interrupter switch 78, the other terminal extending by conductor 110 to our timer control device M.

Branching from conductor 109 are two conductors 111 and 112, the former extending to governor switch 94 and thence to ground 113. Conductor 112 extends to kickdown switch 114 and thence to ground 115. The switch 114 is normally open and is closed preferably by a full depression of accelerator pedal 50 acting through linkage 116. When pedal 50 is thus depressed, the lever 117 which operates the engine throttle valve 118 is positioned to fully open the throttle valve, lever 117 having an upper extension which at such time closes switch 114 to effect a stepdown in the transmission from fourth to third or from second to first.

The governor solenoid circuit is as follows: ground 103 to battery 102 thence by conductor 101 to ammeter 100 and by conductor 99 to ignition switch L. From switch L this circuit extends through conductor 108 and solenoid H and thence by conductors 109 and 111 to switch 94 and ground 93.

The kickdown solenoid circuit is the same as the governor solenoid circuit to conductor 109 whence this circuit extends by conductor 112 to kickdown switch 114 and ground 115.

The engine ignition circuit is the same as the governor solenoid circuit up to the ignition switch L whence this circuit extends by conductor 104 to coil 105 and distributer 106.

The ignition grounding circuit for rendering the ignition inoperative comprises a grounding conductor 119 extending from the primary terminal 107 of distributer 106 to a fixed contact 120 which is normally engaged by contact 121 carried at the outer end of a thermo-active bi-metal conductor member 122 which is fixed at its end opposite to the swinging end having contact 121. A resistance heating element 123 is disposed in thermal association with bi-metal member 122 and is electrically connected between conductor 110 and member 122. From battery 102, preferably by way of switch L, a conductor 124 extends to a resistance 125 and thence to a fixed contact 126 so disposed that when member 122 is subjected to heat of the resistance 123, member 122 deflects and causes contact 121 to separate from contact 120 and to engage contact 126. Resistance 123 is selected so that when current is passed therethrough, according to the circuit to be described, the bi-metal member 122 will deflect so as to cause contact 121 to snap from contact 120 to contact 126 in a predetermined time after closing the interrupter switch 79. While this time may be varied according to the operation desired and according to the functioning of the particular transmission employed with timer M, I have found in practice that a time interval of about one second, for example, is desirable for the illustrated mechanism.

The primary ignition grounding circuit under control of interrupter switch 78 extends from the distributer 106 through conductor 119 to contacts 120 and 121 thence through bi-metal member 122, resistance 123 and conductor 110 to interrupter switch 78. From switch 78 this grounding circuit extends through conductor 109 and thence to a suitable ground. In the illustrated arrangement this ground is provided either at 115 through conductor 112 and kickdown switch 114 or else at 113 through conductor 111 and governor switch 94.

In the event that, for any reason, the interrupter switch 78 remains closed longer than the normal time required when rod 68 moves from its Fig. 11 to its Fig. 12 position, then bi-metal member 122 operates to break the primary ignition grounding circuit by reason of contact 121 swinging over to contact 126 whereupon the ignition system is restored to normal operation. If desired, the member 122 may be arranged to act to restore the ignition in advance of the normal stroke of rod 68. Also, if, when the parts are in the Fig. 11 position, the solenoid should be energized while sleeve F fails to release its engagement with teeth 49, then instead of the ignition system being rendered inoperative as gap 76 is taken up thereby closing switch 78 and tending to maintain the ignition system inoperative, the ignition system is grounded only so long as it takes for resistance 123 to heat bi-metal member 122 causing the primary ignition grounding circuit to be broken.

When contact 121 snaps over to contact 126 to restore the ignition system, then the contact 121 remains in such position as long as the interrupter switch 78 is closed, automatically returning to contact 120 when switch 78 opens. This is brought about by reason of establishing sufficient current through resistance 123 to maintain member 122 heated when contact 121 snaps over to contact 126. At such time current flows from battery 102 through conductor 101, ammeter 100 and conductor 99 thence through switch L to conductor 108, conductor 124, resistance 125 and through contacts 126, 121 to the bi-metal member 122, thence through resistance 123, conductor 110, switch 78 and to ground 115 or 113 just as for the primary ignition grounding circuit. Resistance 125 determines the current flowing through the heater resistance 123, only a small current being ordinarily required such as .5 of an ampere for example although this depends on the type of bi-metal member employed and the extent of thermal proximity thereto. This circuit which is established by contact 121 engaging contact 126, within a predetermined time after closing interrupter switch 78, and the relationship of this circuit with the system of control as a whole, comprises the subject matter of my invention, the remaining features of novelty being claimed in the aforesaid parent application which is now copending in the name of Victor E. Matulaitis. This circuit may be referred to as a secondary ignition restoring circuit and is preferably under control of the ignition switch L so that there is no danger of leaving this circuit closed when the car is parked. Contact 121 is in its selective engagement with contacts 120 and 126 acts in the capacity of temperature or thermo-responsive switch means in series with interrupter switch 78 for controlling both the primary ignition grounding circuit and the secondary ignition restoring circuit.

In the aforesaid Neracher et al. application there is set forth certain circumstances under which the transmission becomes locked-up with sleeves F and 42 clutched and under torque load, and with gap 76 taken up so as to render the engine ignition inoperative. With my invention the ignition system is automatically restored under such conditions making it possible for the engine to operate and unload the teeth of sleeve F so that the same may then be released by spring 67 thereby opening switch 78 and restoring the system to normal operation.

In the operation of the mechanism, the car at standstill and with the ignition switch L closed and the engine idling will cause the solenoid H to be energized as in Fig. 10 because governor switch 94 is closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open to break the governor solenoid circuit. As vacuum builds up in the engine intake manifold K, plunger 80 now being lowered by spring 83 because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kick-down, switch 114 closes thereby energizing the kick-down solenoid circuit and causing solenoid H to raise plunger 80 and release latch 73 thereby venting chamber 74. At this time the sleeve F is under driving torque from the engine operating under wide open throttle. However, when latch 73 is released, spring 67 operates rod 68 rearwardly sufficiently to close gap 76 thereby closing the interrupter switch 78 and causing the primary ignition grounding circuit to ground the engine ignition system. This relieves the torque at sleeve F and spring 67 operates to release the sleeve whereupon the ignition is restored at detent 70 and the engine quickly speeds up to engage overrunning clutch E for establishing the third or first driving ratio depending on the setting of sleeve 42 prior to the kick-down operation.

On bringing the car to a stop when sleeve F is clutched as in fourth for example, the governor J opens governor switch 94 so as to deenergize solenoid H, vent chamber 74 and cause release of sleeve F so that the car will be started in third, assuming the manual sleeve 42 to be left in its forward high range shift position.

If the sleeve F should not release when gap 76 is taken up, or if for any reason the switch 78 remains closed longer than normal, then the timer device M will automatically function, within a predetermined time from the closing of interrupter switch 78, to break the primary ignition grounding circuit and to restore and maintain the ignition system so long as switch 78 remains closed.

If desired, the relationship of heating resistance element 123 and bi-metal member 122 may be such that contact 121 moves over to contact 126 ahead of the normal restoring operation of switch 78 to its open position when rod 68 moves between its Fig. 10 and Fig. 11 positions.

I claim:

1. In a drive for a motor vehicle having an engine provided with an ignition system; transmission means comprising change speed mechanism adapted for manipulation to change the vehicle speed ratio drive; electrical circuit means for rendering said ignition system inoperative; an interrupter switch operable to control said circuit means; means operable to effect said manipulation of said transmission means; means for operating said switch from a first position thereof to a second position thereof as an incident to operation of said transmission manipulating means for establishing said circuit means; thermoresponsive switch means operable from a first position thereof to a second position thereof to open said circuit means with said interrupter switch in its said second position; and electrical circuit means including said thermoresponsive switch means operating in response to operation of said thermo-responsive switch means to its said second position for maintaining the first said circuit means open and the second said circuit means closed as long as said interrupter switch is in its said second position.

2. In a drive for a motor vehicle having an engine provided with an ignition system; transmission means comprising change speed mechanism adapted for manipulation to change the vehicle speed ratio drive; electrical circuit means for rendering said ignition system inoperative; an interrupter switch operable to control said circuit means; means operable to effect said manipulation of said transmission means; means for operating said switch from a first position thereof to a second position thereof as an incident to operation of said transmission manipulating means for establishing said circuit means; thermo-responsive switch means operable from a first position thereof to a second position thereof to open said circuit means with said interrupter switch in its said second position; said circuit means including a resistance in thermal association with said thermo-responsive switch means; and electrical circuit means including said resistance adapted to operate in response to operation of said thermo-responsive switch means to its said second position for maintaining the first said circuit means open as long as said interrupter switch is in its said second position.

3. In a drive for a motor vehicle having an engine provided with an ignition system; transmission means comprising change speed mechanism adapted for manipulation to change the vehicle speed ratio drive; electrical circuit means for rendering said ignition system inoperative; an interrupter switch operable to control said circuit means; means operable to effect said manipulation of said transmission means; means for operating said switch from a first position thereof to a second position thereof as an incident to operation of said transmission manipulating means for establishing said circuit means; said circuit means including thermo-responsive switch means and a resistance thermally associated therewith so constructed and arranged that said thermo-responsive switch means operates to open said circuit means when said interrupter switch is in its said second position; and electrical circuit means including said thermo-responsive switch means, the interrupter switch, and said resistance, for maintaining the first said circuit means open as long as said interrupter switch is in its said second position.

4. In a drive for a motor vehicle having an engine; transmission mechanism operable to provide a drive from the engine to the vehicle, said mechanism including positively engageable drive-control elements cooperable for relative engagement therebetween to establish said drive and for relative disengagement to release said drive, said elements when relatively engaged being subject to thrust-transmission therebetween during said drive so as to resist relative disengagement thereof to release said drive until said thrust-transmission is relieved; an ignition system for said engine adapted to be interrupted to relieve said thrust-transmission; thrust-transmitting means operable to urge relative disengagement of said elements as aforesaid; grounding circuit means adapted, when completed, to ground said ignition system by causing current flow from said ignition system to ground, thereby effecting said interruption; control means operable to effect completion of said grounding circuit means so as to accommodate relative disengagement of said elements by said thrust-transmitting means, normally automatically followed by opening of said grounding circuit means within a predetermined time interval in response to relative disengaging movement of said elements thereby to effect restoration of said ignition system to normal operation; a thermo-responsive element interposed in said grounding circuit means; a secondary circuit adapted to be closed under control of said thermo-responsive element for rendering said ignition system operative; and means response to said flow of current through said grounding circuit means beyond said time interval for causing said thermo-responsive element to open said grounding circuit means and closing said secondary circuit thereby to effect restoration of said ignition system to normal operation upon failure of said control means to open said grounding circuit means; said secondary circuit acting, when closed as aforesaid, to cause said thermo-responsive element to maintain said grounding circuit means open and said secondary circuit closed.

5. In a drive for a motor vehicle having an engine; transmission mechanism operable to provide a drive from the engine to the vehicle, said mechanism including positively engageable drive-control elements cooperable for relative engagement therebetween to establish said drive and relative disengagement to release said drive, said elements when relatively engaged being subject to thrust-transmission therebetween during said drive so as to resist relative disengagement thereof to release said drive until said thrust-transmission is relieved; an ignition system for said engine adapted to be interrupted to relieve said thrust-transmission; thrust-transmitting means operable to urge relative disengagement of said elements as aforesaid; grounding circuit means adapted, when completed, to ground said ignition system by causing current flow from said ignition system to ground, thereby effecting said interruption; control means operable to effect completion of said grounding circuit means so as to accommodate relative disengagement of said elements by said thrust-transmitting means, normally automatically followed by opening of said grounding circuit means within a predetermined time interval in response to relative disengaging movement of said elements thereby to effect restoration of said ignition system to normal operation; said grounding circuit means including a thermo-responsive element and an electrically energized heating element in thermal relationship with said thermo-responsive element; a secondary circuit adapted to be closed under control of said thermo-responsive element for rendering said ignition system operative; said flow of current through said grounding circuit means beyond said time interval acting to energize said heating element so as to cause said thermo-responsive element to open said grounding circuit means and close said secondary circuit thereby to effect restoration of said ignition system to normal operation upon failure of said control means to open said grounding circuit means; said secondary circuit including said heating element such that, when this circuit is closed as aforesaid, said thermo-responsive element acts to maintain said grounding circuit means open and said secondary circuit closed.

6. A control for an engine ignition system comprising; an electrical grounding circuit adapted, when closed, to ground said ignition system by causing current to flow from said ignition system to ground, thereby rendering said ignition system inoperative; an ignition interrupter switch interposed in said grounding circuit; means normally operating to momentarily close said interrupter switch for effecting momentary grounding of said ignition system; said grounding circuit including thermo-responsive switch means; a resistance thermally associated with said thermo-responsive switch means and so constructed and arranged as to respond to said current flow for causing said thermo-responsive switch means to open said grounding circuit when said interrupter switch remains closed longer than momentarily; and a second electrical circuit including said interrupter switch and said thermo-responsive switch means, said second circuit being closed by operation of said thermo-responsive switch means in opening said grounding circuit, said thermo-responsive switch means responding to current flow in said second circuit for maintaining said second circuit closed and said grounding circuit open.

7. In combination with a shift member for a variable speed transmission for internal combustion engines, an engine ignition system, a grounding circuit for said ignition system including a normally open switch, a normally closed switch, means responsive to initial movement of the shift member for closing said normally open switch, heat-responsive means for opening the normally closed switch, heating means for the heat-responsive means energized by closure of the normally open switch, and electrical circuit means, including said heating means, automatically established as an incident to said opening of said normally closed switch for energizing said heating means.

8. In combination with a shift member for a variable speed transmission for internal combustion engines, an engine ignition system, a grounding circuit for said ignition system including a normally open switch, a normally closed switch, means responsive to initial movement of the shift member for closing said normally open switch, heat-responsive means for opening the normally closed switch, heating means for the heat-responsive means energized by closure of the normally open switch, and electrical circuit means, including said heating means and said normally open switch, automatically established by said opening of said normally closed switch for maintaining said heating means energized as long as said normally open switch remains closed.

EDMOND F. WEBB.